United States Patent
Kuan et al.

(10) Patent No.: US 9,378,377 B1
(45) Date of Patent: Jun. 28, 2016

(54) SYSTEM FOR INFORMATION FLOW SECURITY INFERENCE THROUGH PROGRAM SLICING

(71) Applicant: HRL Laboratories, LLC, Malibu, CA (US)

(72) Inventors: George Kuan, Westlake Village, CA (US); Aleksey Nogin, Fresno, CA (US); Alexei Kopylov, South Pasadena, CA (US)

(73) Assignee: HRL Laboratories, LLC, Malibu, CA (US)

( * ) Notice: Subject to any disclaimer, the term of this patent is extended or adjusted under 35 U.S.C. 154(b) by 93 days.

(21) Appl. No.: 14/208,501

(22) Filed: Mar. 13, 2014

Related U.S. Application Data (60) Provisional application No. 61/778,943, filed on Mar. 13, 2013.

(51) Int. Cl.
  *G06F 21/00* (2013.01)
  *G06F 21/60* (2013.01)
(52) U.S. Cl.
  CPC ...................... *G06F 21/60* (2013.01)
(58) Field of Classification Search
  CPC ........................................................ G06F 21/60
  USPC ............................................................. 726/1
  See application file for complete search history.

(56) References Cited

U.S. PATENT DOCUMENTS

| | | | |
|---|---|---|---|
| 2011/0277037 A1* | 11/2011 | Burke et al. | 726/26 |
| 2012/0023486 A1* | 1/2012 | Haviv et al. | 717/126 |
| 2013/0014093 A1* | 1/2013 | Lee | 717/142 |
| 2013/0263092 A1* | 10/2013 | Chikahisa et al. | 717/126 |

OTHER PUBLICATIONS

Andrey Chudnov and David A. Naumann. Information flow monitor inlining. Computer Security Foundations Symposium, IEEE, 0:200-214, 2010. DOI: 10.1109/CSF.2010.21.
Albert Diserholt. Providing integrity policies as a library in Haskell. Master's thesis, Chalmers University of Technology. 2010.
Gartner. Gartner says security software market is poised for 11 percent growth in 2010. Gartner Press Release, 2010.
Nevin Heintze and Jon G. Riecke. The SLam calculus: programming with secrecy and integrity. In Proceedings of the 25th ACM SIGPLAN-SIGACT symposium on Principles of programming languages (POPL'98), pp. 365-377. New York, NY, USA, 1998. ACM. ISBN 0-89791-979-3. DOI: 10.1145/268946.268976.
Dongseok Jang, Ranjit Jhala, Sorin Lerner, and Hovav Shacham. An empirical study of privacy-violating information flows in Javascript web applications. In Ehab Al-Shaer, Angelos D. Keromytis, and Vitaly Shmatikov, editors, ACM Conference on Computer and Communications Security, pp. 270-283. ACM, 2010. ISBN 978-1-4503-0245-6. DOI: 10.1145/1866307.1866339.

(Continued)

*Primary Examiner* — Mahfuzur Rahman
(74) *Attorney, Agent, or Firm* — Tope-McKay & Associates (57) ABSTRACT

The present invention relates to a system for information flow security inference through program slicing. In operation, the system receives an information flow security policy for source code security, refines the information flow security policy, and analyzes the source code to provide refinements as constraints, such that if there is a source code violation of the constraints, the source code is identified for inspection and removal.

12 Claims, 6 Drawing Sheets

(56) References Cited

OTHER PUBLICATIONS

Peng Li and Steve Zdancewic. Encoding information flow in Haskell. In CSFW '06: Proceedings of the 19th IEEE workshop on Computer Security Foundations, p. 16, Washington, DC, USA, 2006 IEEE Computer Society. ISBN 0-7695-2615-2. DOI: 10.1109/CSFW.2006.13.

Gary McGraw. Software [in]security: Software security crosses the threshold. informIT, 2010.

Jonas Magazinius, Alejandro Russo, and Andrei Sabelfeld. On-the-fly inlining of dynamic security monitors. In Kai Rannenberg, Vijay Varadharajan, and Christian Weber, editors, Security and Privacy—Silver Linings in the Cloud, vol. 330 of IFIP Advances in Information and Communication Technology, pp. 173-186. Springer Boston, 2010. DOI: 10.1007/978-3-642-15257-3 16.

Andrew C. Myers. JFlow: practical mostly-static information flow control. In POPL '99: Proceedings of the 26th ACM SIGPLAN-SIGACT symposium on Principles of programming languages, pp. 228-241. ACM, 1999. ISBN 1-58113-095-3. DOI: 10.1145/292540.292561. URL: http://www.cs.cornell.edu/andru/papers/popl99/popl99.pdf.

James Newsome and Dawn Xiaodong Song. Dynamic taint analysis for automatic detection, analysis, and signature generation of exploits on commodity software. In NDSS. The Internet Society, 2005. ISBN 1-891562-20-7, 1-891562-19-3. URL: http://www.isoc.org/isoc/conferences/ndss/05/proceedings/papers/taintcheck.pdf.

Peter Ørbæk. Can you trust your data? In Peter D. Mosses, Mogens Nielsen, and Michael I. Schwartzbach, editors, TAPSOFT, vol. 915 of Lecture Notes in Computer Science, pp. 575-589. Springer. 1995. ISBN 3-540-59293-8. DOI: 10.1007/3-540-59293-8 221.

Fran,cois Pottier and Vincent Simonet, Information flow inference for ML. In POPL '02: Proceedings of the 29th ACM SIGPLANSIGACT symposium on Principles of programming languages, pp. 319-330, New York, NY, USA. 2002. ACM ISBN 1-58113-450-9. DOI: 10.1145/503272.503302. URL: http://cristal.inna.fr/>>simonet/publis/fpottier-simonet-toplas.pdf.

Alejandro Russo, Koen Claessen, and John Hughes. A library for light-weight information-flow security in Haskell. In Haskell '08: Proceedings of the first ACM SIGPLAN symposium on Haskell, pp. 13-24, New York, NY, USA, 2008. ACM. ISBN 978-1-60558-064-7. DOI: 10.1145/1411286.1411289.

Andrei Sabelfeld and Andrew C. Myers. A model for delimited information release. In K. Futatsugi, F. Mizoguchi, and N. Yonezaki, editors, ISSS 2003, vol. 3233 of ISSS 2003, pp. 174-101. Springer, 2003.

Vincent Simonet and Inria Rocquencourt. Flow Caml in a nutshell. In Proceedings of the first APPSEM-II workshop, pp. 152-165, 2003.

Omer Tripp, Marco Pistoia, Stephen J. Fink, Manu Sridharan, and Omrin Weisman. Taj: effective taint analysis of web applications. In Proceedings of the 2009 ACM SIGPLAN conference on Programming language design and implementation (PLDI'09), pp. 87-97, New York, NY, USA, 2009. ACM ISBN 978-1-60558-392-1. DOI: 10.1145/1542476.1542486.

Jeffrey A. Vaughan and Stephen Chong. Inference of expressive declassification policies. In Proceedings of the 2011 IEEE Symposium on Security and Privacy, May 2011, URL: http://people.seas.harvard.edu/>>chong/pubs/oakland11inference.pdf.

Dachuan Yu, Ajay Chander, Nayeem Islam, and Igor Serikov, Javascript instrumentation for browser security. In Proceedings of the 34th annual ACM SIGPLAN-SIGACT symposium on Principles of programming languages (POPL'07), pp. 237-249, New York, NY, USA, 2007. ACM. ISBN 1-59593-575-4. DOI: 10.1145/1190216.1190252.

* cited by examiner

SYSTEM FOR INFORMATION FLOW SECURITY INFERENCE THROUGH PROGRAM SLICING

CROSS-REFERENCE TO RELATED APPLICATIONS

This is a Non-Provisional Utility Application of U.S. Provisional Application No. 61/778,943, filed on Mar. 13, 2013, entitled, "Information Flow Security Inference through Program Slicing."

BACKGROUND OF THE INVENTION (1) Field of Invention

The present invention relates to a security system and, more particularly, to a system for detecting source code security flaws through program slicing.

(2) Description of Related Art

Secure information flow is an important foundation to most security and computer systems. The research of security policy of software and, in particular, of information flow policy has a long history (e.g., greater than twenty years). Despite the fact that a variety of security languages have been proposed, none of them are widely used. The main reason for the lack of a uniform or widely used security language is the difficulty in writing and understanding the security policy.

Examples of prior art include a data flow-based inference technique (see the List of Cited Literature References, Literature Reference No. 17) for inferring declassification policies and a technique for taint checking using hybrid thin slicing (see Literature Reference No. 16). The former reference focuses exclusively on declassification policies. As such, it still requires manual labeling of programs with security labels before applying the analysis. The later reference considers the application of a particular form of program slicing, but the focus is on taint checking for explicit flows only. The taint checking approach does not consider techniques for simplifying the dependency graph by slicing as a means for presenting the summarized dependency graph as a usable information flow policy. In fact, the policies supported in the taint checking approach are simplistic, not accounting for endorsement. Neither of the above works consider the issue of optimizing policy for precision and added value of interactive feedback from the user for the analysis.

In information flow security, prior art falls into three general categories: dynamic taint analysis (see Literature Reference Nos. 1, 5, 8, 10, and 18), secure information flow compilers (see Literature Reference Nos. 4, 9, 12, and 15), and information flow security libraries for general-purpose programming languages (see Literature Reference Nos. 2, 6, and 13). While the aforementioned prior art does provide some level of security, none of those approaches incorporate any kind of code history analysis. As a result, such approaches require software developers to manually write the security policy, which significantly increases the code development cost.

Thus, a continuing need exists for a system that computes useful data about program information flow while reducing the need for an explicitly written security policy and the amount of manual annotations required.

SUMMARY OF INVENTION

The present invention relates to a security system, method and computer program product for detecting source code security flaws through program slicing. The system, for example, includes one or more processors and a memory. The memory is a non-transitory computer-readable medium having executable instructions encoded thereon, such that upon execution of the instructions, the one or more processors perform the operations described herein. For example, in operation, the system receives an information flow security policy for source code security, refines the information flow security policy, and analyzes the source code to provide refinements as constraints, such that if there is a source code violation of the constraints, the source code is identified for inspection and removal.

In another aspect, a system dependence graph (SDG) of a program source code is constructed. The SDG is a directed graph representing flow chart dependencies in the source code and includes program blocks and nodes, with paths between the blocks and nodes. All paths containing nodes of interest in the SDG are identified through program slicing for both confidentiality analysis and integrity analysis, such that for confidentiality analysis, a forward slice is computed from high confidentiality variables, and for integrity analysis, a backwards slice is computer from low integrity variables. If both sources and sinks are known, the system computes both a forwards slice on the sources and a backwards slice on the sinks and then computes the intersection of the two slices. The slicing results can be presented to an analyst for feedback for refinement through security level labeling and declassification cuts to generate a new information flow policy. If the analyst determines that the new information flow policy is in agreement with an intentional policy, then the process is terminated. Alternatively, if the analyst determines that the new information flow policy is not in agreement with an intentional policy, then repeating program slicing and presentation of the results to the analyst.

Finally and as noted above, the present invention also includes a computer program product and a computer implemented method. The computer program product includes computer-readable instructions stored on a non-transitory computer-readable medium that are executable by a computer having one or more processors, such that upon execution of the instructions, the one or more processors perform the operations listed herein. Alternatively, the computer implemented method includes an act of causing a computer to execute such instructions and perform the resulting operations.

BRIEF DESCRIPTION OF THE DRAWINGS

The objects, features and advantages of the present invention will be apparent from the following detailed descriptions of the various aspects of the invention in conjunction with reference to the following drawings, where.

DETAILED DESCRIPTION

The present invention relates to a security system and, more particularly, to a system for detecting source code security flaws through program slicing. The following description is presented to enable one of ordinary skill in the art to make and use the invention and to incorporate it in the context of particular applications. Various modifications, as well as a variety of uses in different applications will be readily apparent to those skilled in the art, and the general principles defined herein may be applied to a wide range of embodiments. Thus, the present invention is not intended to be limited to the embodiments presented, but is to be accorded the widest scope consistent with the principles and novel features disclosed herein.

In the following detailed description, numerous specific details are set forth in order to provide a more thorough understanding of the present invention. However, it will be apparent to one skilled in the art that the present invention may be practiced without necessarily being limited to these specific details. In other instances, well-known structures and devices are shown in block diagram form, rather than in detail, in order to avoid obscuring the present invention.

The reader's attention is directed to all papers and documents which are filed concurrently with this specification and which are open to public inspection with this specification, and the contents of all such papers and documents are incorporated herein by reference. All the features disclosed in this specification, (including any accompanying claims, abstract, and drawings) may be replaced by alternative features serving the same, equivalent or similar purpose, unless expressly stated otherwise. Thus, unless expressly stated otherwise, each feature disclosed is one example only of a generic series of equivalent or similar features.

Furthermore, any element in a claim that does not explicitly state "means for" performing a specified function, or "step for" performing a specific function, is not to be interpreted as a "means" or "step" clause as specified in 35 U.S.C. Section 112, Paragraph 6. In particular, the use of "step of" or "act of" in the claims herein is not intended to invoke the provisions of 35 U.S.C. 112, Paragraph 6.

Before describing the invention in detail, first a list of cited literature references is provided. Next, a description of various principal aspects of the present invention is provided. Subsequently, an introduction provides the reader with a general understanding of the present invention. Thereafter, details of the present invention are provided to give an understanding of the specific aspects.

(1) LIST OF CITED LITERATURE REFERENCES

The following references are cited throughout this application. For clarity and convenience, the references are listed herein as a central resource for the reader. The following references are hereby incorporated by reference as though fully included herein. The references are cited in the application by referring to the corresponding literature reference number, as follows:

1. Andrey Chudnov and David A. Naumann. Information flow monitor inlining. *Computer Security Foundations Symposium*, IEEE, 0:200-214, 2010.
2. Albert Diserholt. Providing integrity policies as a library in Haskell. Master's thesis, Chalmers University of Technology, 2010.
3. Gartner. Gartner says security software market is poised for 11 percent growth in 2010. Gartner Press Release, 2010.
4. Nevin Heintze and Jon G. Riecke. The SLam calculus: programming with secrecy and integrity. In *Proceedings of the 25th ACM SIGPLAN-SIGACT symposium on Principles of programming languages (POPL '98)*, pages 365-377, New York, N.Y., USA, 1998.
5. Dongseok Jang, Ranjit Jhala, Sorin Lerner, and Hovav Shacham. An empirical study of privacy-violating information flows in Javascript web applications. In Ehab Al-Shaer, Angelos D. Keromytis, and Vitaly Shmatikov, editors, *ACM Conference on Computer and Communications Security*, pages 270-283. ACM, 2010.
6. Peng Li and Steve Zdancewic. Encoding information flow in Haskell. In *CSFW '06: Proceedings of the 19th IEEE workshop on Computer Security Foundations*, page 16, Washington, D.C., USA, IEEE Computer Society. 2006.
7. Gary McGraw. Software [in]security: Software security crosses the threshold. *informIT*, 2010.
8. Jonas Magazinius, Alejandro Russo, and Andrei Sabelfeld. On-the-fly inlining of dynamic security monitors. In Kai Rannenberg, Vijay Varadharajan, and Christian Weber, editors, *Security and Privacy—Silver Linings in the Cloud*, volume 330 of *IFIP Advances in Information and Communication Technology*, pages 173-186. Springer Boston, 2010.
9. Andrew C. Myers. JFlow: practical mostly-static information flow control. In *POPL '99: Proceedings of the 26th ACM SIGPLAN-SIGACT symposium on Principles of programming languages*, pages 228-241. ACM, 1999.
10. James Newsome and Dawn Xiaodong Song. Dynamic taint analysis for automatic detection, analysis, and signature generation of exploits on commodity software. In *NDSS*. The Internet Society, 2005.
11. Peter Ørbæk. Can you trust your data? In Peter D. Mosses, Mogens Nielsen, and Michael I. Schwartzbach, editors, *TAPSOFT*, volume 915 of *Lecture Notes in Computer Science*, pages 575-589. Springer, 1995.
12. Fran,cois Pottier and Vincent Simonet. Information flow inference for ML. In *POPL '02: Proceedings of the 29th ACM SIGPLANSIGACT symposium on Principles of programming languages*, pages 319-330, New York, N.Y., USA, 2002.
13. Alejandro Russo, Koen Claessen, and John Hughes. A library for light-weight information-flow security in Haskell. In *Haskell '08: Proceedings of the first ACM SIGPLAN symposium on Haskell*, pages 13-24, New York, N.Y., USA, 2008.
14. Andrei Sabelfeld and Andrew C. Myers. A model for delimited information release. In K. Futatsugi, F. Mizoguchi, and N. Yonezaki, editors, *ISSS* 2003, volume 3233 of *ISSS* 2003, pages 174-191. Springer, 2003.
15. Vincent Simonet and Inria Rocquencourt. Flow Caml in a nutshell. In *Proceedings of the first APPSEM-II workshop*, pages 152-165, 2003.
16. Omer Tripp, Marco Pistoia, Stephen J. Fink, Manu Sridharan, and Omri Weisman. Taj: effective taint analysis of web applications. In *Proceedings of the 2009 ACM SIGPLAN conference on Programming language design and implementation (PLDI '09)*, pages 87-97, New York, N.Y., USA, 2009.
17. Jeffrey A. Vaughan and Stephen Chong. Inference of expressive declassification policies. In *Proceedings of the 2011 IEEE Symposium on Security and Privacy*, May 2011.
18. Dachuan Yu, Ajay Chander, Nayeem Islam, and Igor Serikov. Javascript instrumentation for browser security. In *Proceedings of the 34th annual ACM SIGPLAN-SIGACT symposium on Principles of programming languages (POPL '07)*, pages 237-249, New York, N.Y., USA, 2007.

(2) PRINCIPAL ASPECTS

The present invention has three "principal" aspects. The first is a system for detecting source code security flaws. The system is typically in the form of a computer system operating software or in the form of a "hard-coded" instruction set. This system may be incorporated into a wide variety of devices that provide different functionalities. The second principal aspect is a method, typically in the form of software, operated using a data processing system (computer). The third principal aspect is a computer program product. The computer program product generally represents computer-readable instructions stored on a non-transitory computer-readable medium such as an optical storage device, e.g., a compact disc (CD) or digital versatile disc (DVD), or a magnetic storage device such as a floppy disk or magnetic tape. Other, non-limiting examples of computer-readable media include hard disks, read-only memory (ROM), and flash-type memories. These aspects will be described in more detail below.

Figure 1:
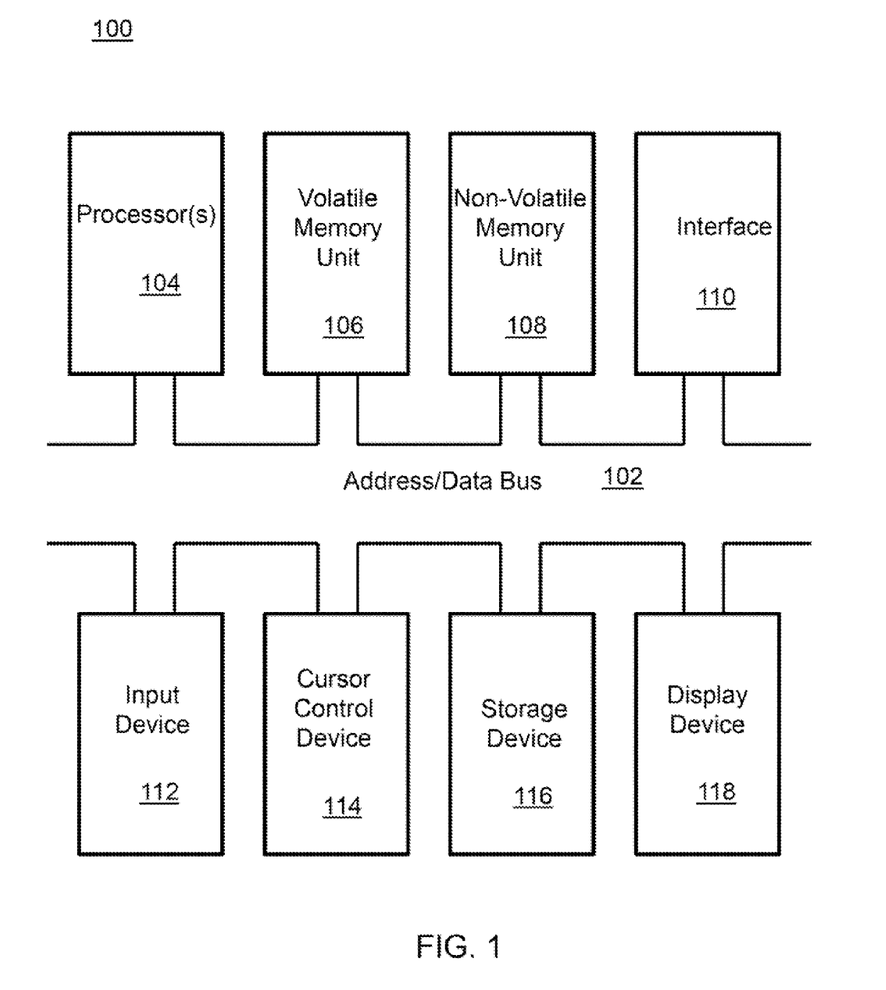
FIG. 1 is a block diagram depicting the components of a system according to the principles of the present invention.

A block diagram depicting an example of a system (i.e., computer system 100) of the present invention is provided in FIG. 1. The computer system 100 is configured to perform calculations, processes, operations, and/or functions associated with a program or algorithm. In one aspect, certain processes and steps discussed herein are realized as a series of instructions (e.g., software program) that reside within computer readable memory units and are executed by one or more processors of the computer system 100. When executed, the instructions cause the computer system 100 to perform specific actions and exhibit specific behavior, such as described herein.

The computer system 100 may include an address/data bus 102 that is configured to communicate information. Additionally, one or more data processing units, such as a processor 104 (or processors), are coupled with the address/data bus 102. The processor 104 is configured to process information and instructions. In an aspect, the processor 104 is a microprocessor. Alternatively, the processor 104 may be a different type of processor such as a parallel processor, or a field programmable gate array.

The computer system 100 is configured to utilize one or more data storage units. The computer system 100 may include a volatile memory unit 106 (e.g., random access memory ("RAM"), static RAM, dynamic RAM, etc.) coupled with the address/data bus 102, wherein a volatile memory unit 106 is configured to store information and instructions for the processor 104. The computer system 100 further may include a non-volatile memory unit 108 (e.g., read-only memory ("ROM"), programmable ROM ("PROM"), erasable programmable ROM ("EPROM"), electrically erasable programmable ROM "EEPROM"), flash memory, etc.) coupled with the address/data bus 102, wherein the non-volatile memory unit 108 is configured to store static information and instructions for the processor 104. Alternatively, the computer system 100 may execute instructions retrieved from an online data storage unit such as in "Cloud" computing. In an aspect, the computer system 100 also may include one or more interfaces, such as an interface 110, coupled with the address/data bus 102. The one or more interfaces are configured to enable the computer system 100 to interface with other electronic devices and computer systems. The communication interfaces implemented by the one or more interfaces may include wireline (e.g., serial cables, modems, network adaptors, etc.) and/or wireless (e.g., wireless modems, wireless network adaptors, etc.) communication technology.

In one aspect, the computer system 100 may include an input device 112 coupled with the address/data bus 102, wherein the input device 112 is configured to communicate information and command selections to the processor 100. In accordance with one aspect, the input device 112 is an alphanumeric input device, such as a keyboard, that may include alphanumeric and/or function keys. Alternatively, the input device 112 may be an input device other than an alphanumeric input device. In an aspect, the computer system 100 may include a cursor control device 114 coupled with the address/data bus 102, wherein the cursor control device 114 is configured to communicate user input information and/or command selections to the processor 100. In an aspect, the cursor control device 114 is implemented using a device such as a mouse, a track-ball, a track-pad, an optical tracking device, or a touch screen. The foregoing notwithstanding, in an aspect, the cursor control device 114 is directed and/or activated via input from the input device 112, such as in response to the use of special keys and key sequence commands associated with the input device 112. In an alternative aspect, the cursor control device 114 is configured to be directed or guided by voice commands.

In an aspect, the computer system 100 further may include one or more optional computer usable data storage devices, such as a storage device 116, coupled with the address/data bus 102. The storage device 116 is configured to store information and/or computer executable instructions. In one aspect, the storage device 116 is a storage device such as a magnetic or optical disk drive (e.g., hard disk drive ("HDD"), floppy diskette, compact disk read only memory ("CD-ROM"), digital versatile disk ("DVD")). Pursuant to one aspect, a display device 118 is coupled with the address/data bus 102, wherein the display device 118 is configured to display video and/or graphics. In an aspect, the display device 118 may include a cathode ray tube ("CRT"), liquid crystal display ("LCD"), field emission display ("FED"), plasma display, or any other display device suitable for displaying video and/or graphic images and alphanumeric characters recognizable to a user.

The computer system 100 presented herein is an example computing environment in accordance with an aspect. However, the non-limiting example of the computer system 100 is not strictly limited to being a computer system. For example, an aspect provides that the computer system 100 represents a type of data processing analysis that may be used in accordance with various aspects described herein. Moreover, other computing systems may also be implemented. Indeed, the spirit and scope of the present technology is not limited to any single data processing environment. Thus, in an aspect, one or more operations of various aspects of the present technology are controlled or implemented using computer-executable instructions, such as program modules, being executed by a computer. In one implementation, such program modules include routines, programs, objects, components and/or data structures that are configured to perform particular tasks or implement particular abstract data types. In addition, an aspect provides that one or more aspects of the present technology are implemented by utilizing one or more distributed computing environments, such as where tasks are performed by remote processing devices that are linked through a communications network, or such as where various program modules are located in both local and remote computer-storage media including memory-storage devices.

Figure 2:
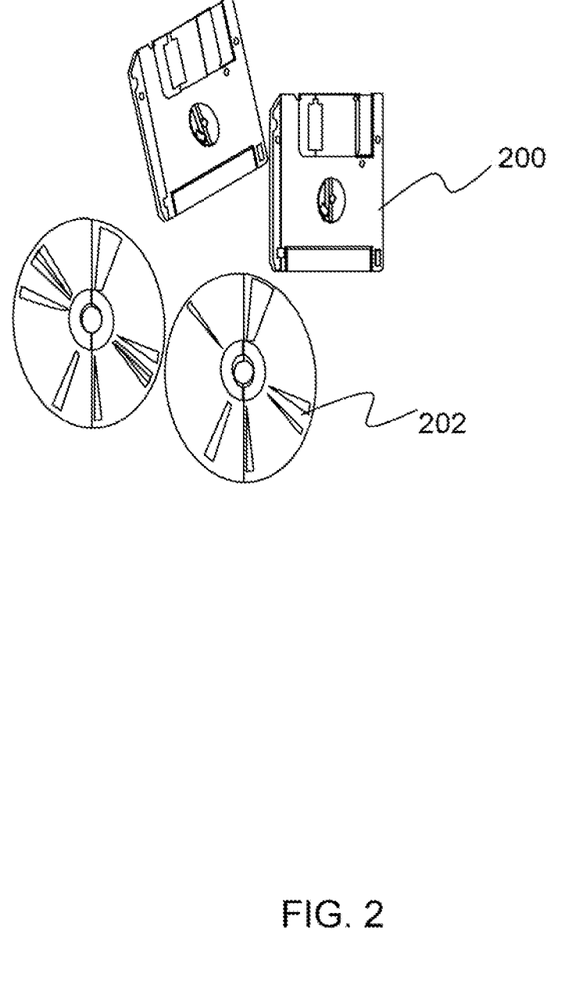
FIG. 2 is an illustration of a computer program product embodying an aspect according to the principles of the present invention.

An illustrative diagram of a computer program product (i.e., storage device) embodying an aspect of the present invention is depicted in FIG. 2. The computer program product is depicted as floppy disk 200 or an optical disk 202 such as a CD or DVD. However, as mentioned previously, the computer program product generally represents computer-readable instructions stored on any compatible non-transitory computer-readable medium. The term "instructions" as used with respect to this invention generally indicates a set of operations to be performed on a computer, and may represent pieces of a whole program or individual, separable, software modules. Non-limiting examples of "instructions" include computer program code (source or object code) and "hard-coded" electronics (i.e. computer operations coded into a computer chip). The "instructions" may be stored on any non-transitory computer-readable medium, such as in the memory of a computer, or on a floppy disk, a CD-ROM, and a flash drive. In either event, the instructions are encoded on a non-transitory computer-readable medium.

(3) INTRODUCTION

Secure and robust operation of software is critical for modern software systems. The system according to the present invention includes inference techniques that provide mathematical guarantees of security (confidentiality and integrity). Core to the system is a collection of algorithms for information flow security policy inference from source code. The inference algorithms identify security labels, declassification points, and declassification conditions which are consistent with the source code being analyzed, and the implicit information flow policy derived from system dependencies (such as control flow and data flow). The inference and optimization leverages system dependency graphs and program slicing to provide complete yet precise analysis of program information flow. The non-standard application of such program analysis techniques to the new domain of information flow policy analysis goes beyond previous approaches that treated policy as a unidirectional means for programmer input to the program security analysis. The approach according to the principles of the present invention takes full advantage of the structure and information embedded in the implicit information flow policy to improve program security beyond mere error checking.

Thus, the present invention is directed to a system, method, and computer program product for analyzing the security properties of software source code. By analyzing the security policies themselves and supporting the incremental improvement of the policies in terms of accuracy and precision, the system aims to fill the modeling gap between the actual security requirements for a software system and its formal, machine readable/verifiable security policy.

(4) SPECIFIC ASPECTS OF THE INVENTION

(4.1) Overview

Figure 3:
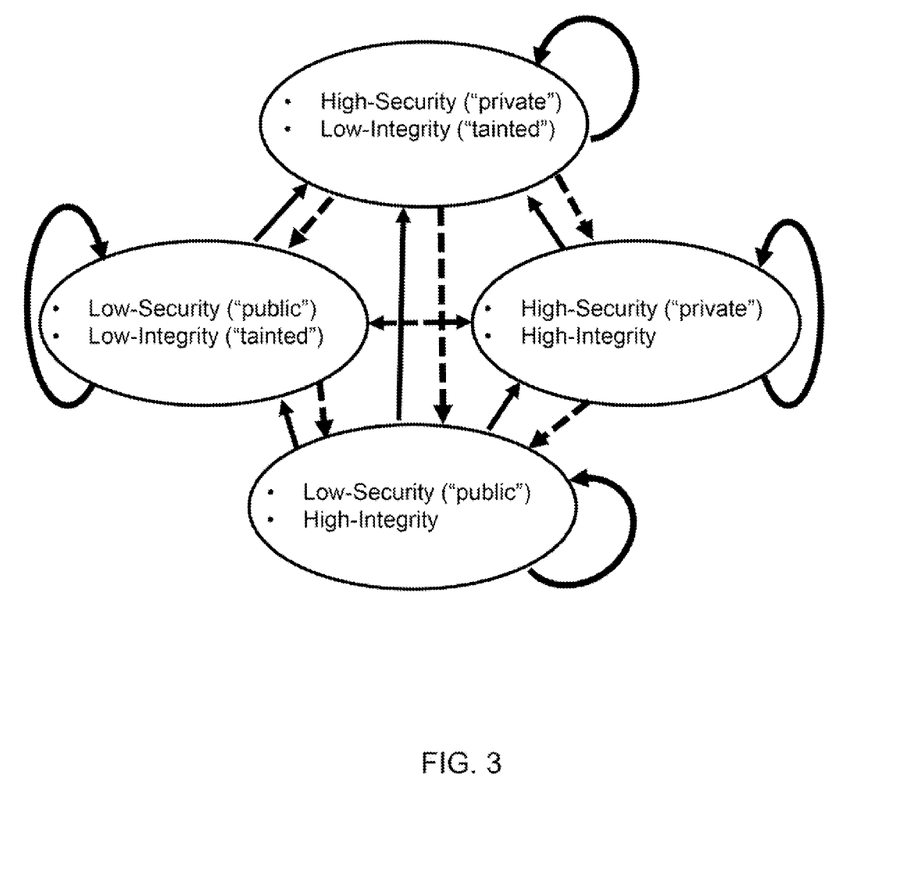
FIG. 3 is an example of an information flow lattice.

The core idea of information flow security is to prohibit any information flow (both explicit flows due to assignment and implicit flows due to paths not taken or control flow) from a set of confidential variables to a set of public channels. The identification of the confidential variables and public channels forms the basic policy. This notion of policy can be further enriched by admitting multiple levels of confidentiality (e.g., High-Medium-Low), adding a dual integrity dimension (e.g. Tainted/High-Integrity), and so on. The only restriction is that the levels of confidentiality must form a lattice (i.e., must have a well-defined least upper bound and greatest lower bound for each pair of levels). An example of such lattice is provided in FIG. 3. Here the information flow labels have two components: it may of high or low security (private/public) and it may have high or low integrity (trusted/tainted), thus there are four types of security labels. The solid lines in FIG. 3 represent legal information flow, while the dashed line represents the illegal or suspicious information flow (i.e., flow from high security variable to a low security one, or from tainted data to a trusted one). To make such policies practical, one must define where (in the source code) and under what conditions may computations on confidential variable be declassified to a less confidential level.

Automatic information flow enforcement is only as good as the supplied policy. Ideally, a supplied policy must be neither too permissive nor too strict. If it is too permissive, the analysis will yield too many false negatives and thus claim that a program is secure when it really is not. A policy that is too strict is also pernicious because too many false positives would require an impractical amount of manual filtering, thus making it much more likely for programmers to ignore the results of the information flow analysis altogether. In order improve the practical utility of information flow analysis, the system automatically infers, optimizes, and iteratively refines information flow security policies. These techniques reduces the amount of error-prone manual effort in construction of a useful information flow security policy.

Figure 4:
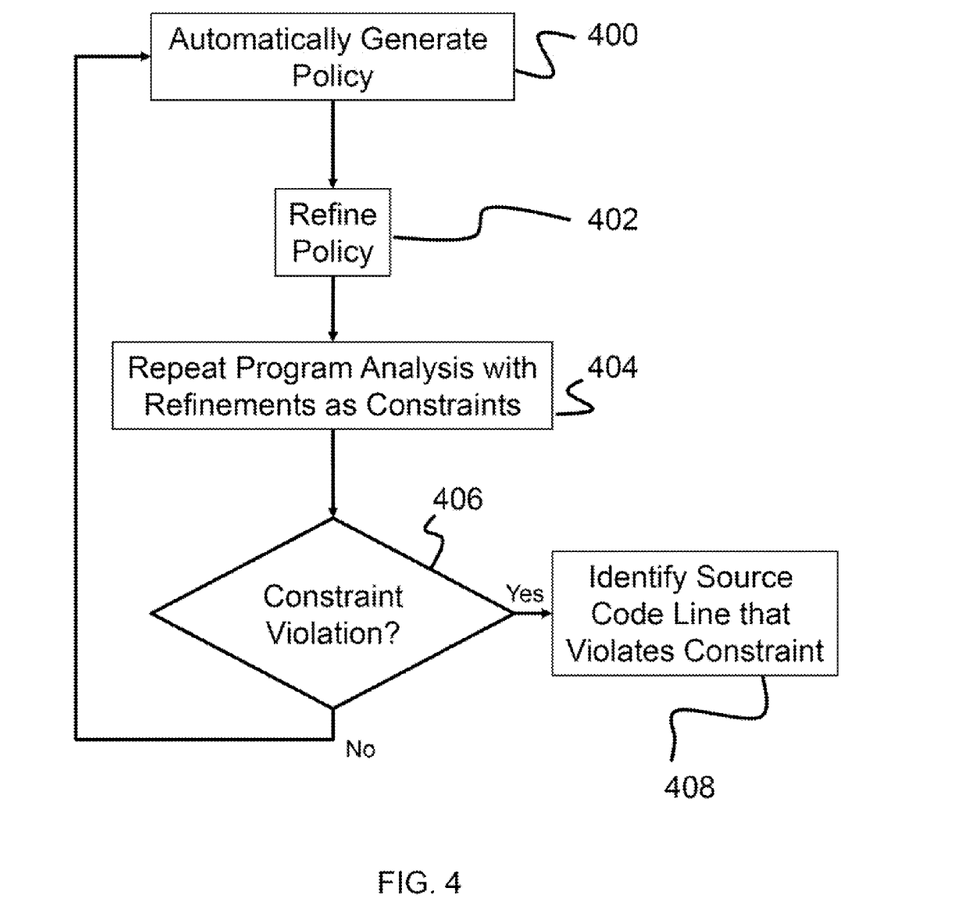
FIG. 4 is a flow chart depicting iterative information flow policy refinement and feedback.

Thus and as shown in FIG. 4, the system according to one aspect automatically generates 400 the policy based on, for example, a predefined supplied policy as retrieved from a policy database and assigned to the applicable code or as generated per the procedure below (for example, in the section "Policy Inference and Optimization"). The policy can be refined 402 automatically or through manual refinement, such as by modifying the security labels in a lattice (and via program slicing). Program analysis 404 is performed to provide refinements as constraints, which are then used to identify constraint violations 406. Such analysis and constraints are also described in further detail below. If there is a source code violation 408, the source code line is identified for inspection and/or removal (which can also be accomplished via program slicing). If there is not a source code violation, then the policy is updated and iteratively refined.

(4.2) Information Flow Security Policy Representation

Each variable in a program belongs to a security level. The security levels in a program should form a lattice, i.e., they must be partially ordered and each pair of elements must have a well-defined least upper bound and greatest lower bound. Policy representations have typically been in the form of annotations embedded in the program source code, the simplest of which is a security label from the lattice indicating where a given program variable fits in the security lattice. This representation amounts to a tuple of a set of program source locations (for variable declarations or parameter signatures). In the simple case, it is 2-tuple, one set of sources (high variables) and sinks (low ones).

In order to support declassification, this representation is enriched. Formally, an information flow security policy with declassification is a 3-tuple, (L, s, P)), where L, is a security lattice, s mapping from program variables to an element in the L, and P is a set of declassification points and any relevant declassification conditions. The set of declassification points P are program points. They can be represented as a tag on expressions. For example, declassify (x<3) declassifies the results of the comparison from a security level to the immediately lower security level. Declassification conditions are boolean program expressions (all boolean expressions in any given host programming language) that must hold for a declassification to be permitted.

The host programming language must be enriched with host language annotations, as follows:
1. Security labels l::=H|L| . . .
2. variable bindings b::= . . . |$x^l$:=e
3. Expressions e::= . . . |declassify(e)|declassify(e) if e The host language must be enriched with the above annotation constructs in order to encode the hints to help the analysis determine the security policy. In practice, these annotations can be encoded in comments so as to maintain source-level compatibility with existing tools.

With the host language enriched with constructs, the following inference algorithm can be employed:
1. Collect constraints.
    i. Lattice: Collect all labels in the annotation. This forms a minimum lattice.
    ii. Labeling: Collect all label and labeled variable names.
    iii. Declassification Constraints: Collect declassification points.
2. Generate constraints from declassification points and lattices.
3. Determine if a solution exists (constraint solver). A solution exists if there is a set of declassification points that satisfy the above constraints.

(4.3) Policy Inference and Optimization

The system infers information flow policies in several steps and then subsequently optimizes this representation. It is desirable to determine admissible security lattices, labelings of program variables, declassification points, and declassification conditions.

(4.3.1) Security Lattices

Every syntactically correct program admits at least one viable security lattice, the one-point lattice, which can be interpreted as either all variables are high or alternatively all are low. Lattices are informative only when one has more than one point where at least one variable in the program is distinguished in terms of security label. To produce a labeling of a lattice with more than two-points requires a labeling strategy.

Given an unannotated program, what security lattice is a "good fit"? Assuming that each subsequent assignment equates to a lower security level, one naive strategy is to tag each occurrence of variables on the right hand side of assignments with declassify. For example, the following program:
   $x0:=0$
   $x1:x0$
   $x2:=x0+x1$
   $x3:=x0+x1+x2$
can rewrite to the following:
   $x0:=0$
   $x1:=declassify(x0)$
   $x2:=declassify(x0)+declassify(x1)$
   $x3:=declassify(x0)+declassify(x1)+declassify(x2)$ The above strategy (the oblivious strategy) maximizes the implicit number of security levels with respect to the number of explicit flows in the program. Without any domain knowledge of the program, this is the finest grain possible labeling of a program with declassification. This declassification labeling implies a lattice labeling of one security level for each declassify.

This labeling strategy assigns a distinct security label for each and every flow. Another strategy is to assume the presence of declassification points and use those declassification points to demarcate security labels. In this case, a security label can be thought of as a naturals ordering where each label n counts how many declassification points is a labeled variable away from a given high variable or a set of high variables. The idea is to introduce a new security level for each layer of declassify (i.e., how many declassify's removed from the high variable). This would produce a lattice of the max length in the graph, as follows:
   $H\ x0:=0$
   $M0\ x1:=declassify(x0)$
   $M1\ x2:=declassify(x0)+declassify(x1)$
   $M2\ x3:=declassify(x0)+declassify(x1)+declassify(x2)$ The security level then becomes a measure of how far removed from a high variable is a given variable. The security levels must then be coalesced/consolidated, as follows:
   $H\ a:=0$
   $H\ b:=1$
   $H\ c:=2$
      $x0:=(a,b)$
      $x1:=(b,c)$
      $x2:=(fst\ x0,\ snd\ x1,\ c)$
   In the above example, there is no reason to introduce a new security level for x2, because it is effectively H.

Once given some existing security labels or reasonable defaults such as labeling standard input/output (I/O), files, and network sockets High or Low, one can do better than the oblivious labeling approach. Security labels can be supplied by programmer input in terms of source code annotations or some default configuration for the analysis which assigns a security level to select program identifiers. This is equivalent to labeling each declaration of the said identifier with a corresponding security label, such as:
   $H\ x0:=0$
      $x1:=x0$
      $x2:=x1$
   $L\ x3:=x2$ In the above program, clearly some declassification must take place or else the program has a bug. The labeling of x0 and x3 implies at least one declassification. One can use the oblivious strategy here to expand the security lattice to a 4-point one. However, since the pre-labeling implies a lattice of at least 2 points (H, L), it may be more important to keep the lattice as small as possible. Lattices of size 2 to 4 satisfy the constraints of the above program. For the minimum size lattice (size 2), one declassify must be inserted. In this example, there are three possible locations for the declassify, such as assignments of variables x1, x2, and x3.

(4.3.2) Condition Inference

Declassification conditions are a consequence of control dependences. Control dependences in the program path to the point of information flow (from high to low) determine under what conditions the declassifying information flow would occur, such as:
   $H\ x0:=0$
   $L\ x1:=some\_input(\ )$
      if (x1>0) {
      if (x1%2=0) {
      } else {
         $L\ x2:=x0$
      }
      }
      }
In the above non-limiting example, the high x0 is declassified to the low x2 precisely when $x1>0\ \Lambda x1\%2\neq 0$. This condition forms part of the security policy. To systematically infer these declassification conditions, the system must scan through the different control flow paths in a program while accumulating a conjunction of test expressions (or negations of test expressions) from each control statement (e.g., if statements/expression, while, and for).

(4.3.3) Simple Declassification Policies

The simplest declassification policy is a declassify tag around the high expression to be explicitly declassified. A measure of "goodness" of the policy can be a combination of two dimensions: the number of declassification tags and the quantity of information being declassified. The intuition is that minimizing the number of declassification tags will increase readability of the policy and minimizing the quantity of information being declassified increases the security guarantees.

Consider the following example:
Program 0
h:=(1, 2, 3)
l0:=declassify (fst h)
l1:=declassify (snd h)
Here, h is a high variable. l0 and l1 are both low.
Program 1
h:=(1, 2, 3)
l:=declassify h
l0:=fst l
l1:=snd l Both Program 0 and 1 achieve the result of declassifying the first and second components of the tuple h. In fact, Program 1 is Program 0 after a common subexpression elimination pass. However, Program 0 does the declassification more precisely than Program 1, because Program 1 also happens to declassify the entire tuple. Even so, Program 1 has the advantage that it only has a single declassification tag, a declassification point, instead of Program 0's two points. In this example, the number of declassification points and quantity of information being declassified are at odds.

Let the acyclic (assuming static single assignment) declassify graph $G=(V,E)$ be such that V is a set of red/black colored vertices, E is a set of blue/grey colored directed edges, and W is a set of weights of the blue edges. An edge from vertex a to h is blue if an only if (iff) a and b are red and black respectively. The red and black vertices represent high and low variables respectively. The blue and grey edges denote declassifying assignment and non-declassifying assignment. Note that the colors are used here only for abstraction and are not actually provided in any drawing included in this specification. In essence, there are two kinds of variables (high and low), which can be represented using any representative technique. As a non-limiting example, the two kinds of variables are being described and represented mathematically as two vertices of two colors (red and black). Similarly, there are two kinds of assignment (declassifying and non-declassifying) that are represented by edges of two colors, blue and grey.

A configuration is a tuple (G, W). Intuitively, running common subexpression elimination (CSE) on a configuration C yields another configuration C' such that for a red vertex v0 in C that is blue-adjacent (i.e., adjacent to via a blue edge) to black vertices wi, C' replaces those blue edges with a single blue edge to a new black vertex that is grey-adjacent to all the wi's. C' is a reduction of C.

A tight configuration is a configuration that both minimizes the number of blue edges and the sum of the weights in W. The declassification points problem is: given a configuration, find a tight configuration. For example, does there exist a tight configuration for all programs? If not, Programs 0 and 1 can be used as example guides. Additionally, given an initial configuration, CSE can be used to obtain reductions.

(4.3.4) Optimizing Declassification Annotations

Security policies can be evaluated with respect to a number of criteria. One set of criteria is as follows:
1. Coverage: Does the security policy describe security requirements for all inputs and outputs?
2. Precision: Does the security policy specify only the requirements and not extraneous conditions?
3. Simplicity: How large and complex is the security policy?

An information flow policy should maximize each of the metrics in the criteria. In Sabelfeld and Myers (see Literature Reference No. 14), the authors suggest a transformation based on a security ordering of programs.
if declassify(x)+declassify(y)<2
then l:=0 else l:=2
==>
if declassify(x+y<2)
then l:=0 else l:=1

The idea is to make declassification policies more centralized and explicit. Sabelfeld and Myers' own example was the following:
h:=parity(h)
if declassify(h=1, low) then (l:=1; h:=1) else (l:=0; h:=0)
==>
if declassify(parity(h), low) then (l:=0; h:=1) else (l:=0; h:=0)

The transformed version makes the true declassify policy explicit. Before such a rewriting, the programmer might have missed the parity part, thinking that only whether h=1 (where h is the original h). To minimize the number of declassify annotations, it appears that declassifying only at the endpoints (the assignments to low variables that forces declassification) is the most parsimonious strategy. For example, consider the following:
A: l2:=declassify(h1)+declassify(h2)
B: l2:=declassify(h1+h2)
B is certainly more parsimonious than A.

However, naive annotation using this strategy is insufficient. Minimizing the number of declassify's by itself does not result in the simplest and most precise policies. Consider the following example:
A: l1:=declassify(h1+1); l2:=declassify(h1% 2); l3:=declassify(h1−1)
B: l4:=declassify(h1); l1:=l4+1; l2:=l4% 2; l3:=l4−1

In the above example, B is more parsimonious in terms of number of declassify's. However, A is a better policy in terms of precision (it declassifies only those values that must be declassified) and simplicity (it gives the analyst more intuitive declassification policies). In B, the declassify's and use of the declassified values are farther removed. Moreover, B declassifies strictly more information, quantitatively, than A. To avoid the extreme of B's policy, a more balanced algorithm must also take into consideration precision and simplicity.

To transform Program B to Program A, the expression for l4 must be inlined in the expressions for l1, l2, and l3, such as:
l1:=declassify(h1)+1; l2:=declassify(h1) % 2; l3:=declassify(h1)−1

Then, the declassify's in each of those three expressions must be pulled out in order to cover the whole expression. This last step can only apply to declassify's produced by the above inlining step because such a transformation reduces the information being declassified. In the case that declassify's are produced by inlining, this is safe (i.e., it does not alter the semantics of the program) because l4's declassified information is only actually leaked through the variables l2, l3, and l4, such as:

l1:=declassify(h1+1); l2:=declassify(h1% 2); l3:=declassify(h1−1)

To summarize, the balanced algorithm for optimizing the placement of declassification consists of the following steps:
1. Minimize the existing set of declassify's by pushing them up the syntax tree. Multiple declassify's can be consolidated.
2. Identify any declassify's that can be inlined. These should be only used in a small number of instances (this heuristic parameter should be determined empirically. For example, if there exists assignments a:=2*h1; b:=3*h2; l:=(a==b), where h1,h2 are of high security and l is of a low security, then declassification should be on a variable l, rather than on a and b). Inline these instances.
3. For all declassify's that come from inlining, these can be expanded to declassify only the results of computation with non-declassifying values.

An alternative strategy is to use a self-adjusting dynamic system dependence graph to derive a profile-driven dynamic declassification policy.

(4.4) Iterative Policy Refinement

A particularly effective method for inferring an information flow policy is to calculate one based on the system dependence graph. The key artifact in policy enforcement is the information flow dependence graph, denoted dependence graph. The dependence graph is a composite of the data flow and control flow graphs. Each node in the graph is a statement in the program. Edges denote control flow and data flow. Information flow policies amount to rules which prohibit certain paths in the dependence graph.

The intuitive approach to an interactive refinement of policy is to have the developer interact directly with the policy as opposed to editing the program source code. Interactions with a policy can take several forms. For example, a developer can redefine a lattice or label program elements based on the lattice. The labeling need not be total. Inference will fill in the missing labels where necessary. In most cases, the policy need not cover the entire program (i.e., all the nodes in the control and data flow graphs) in order to be verified. Only the labels of the intermediate nodes on the path of interest in the dependence graph matter.

Figure 5:
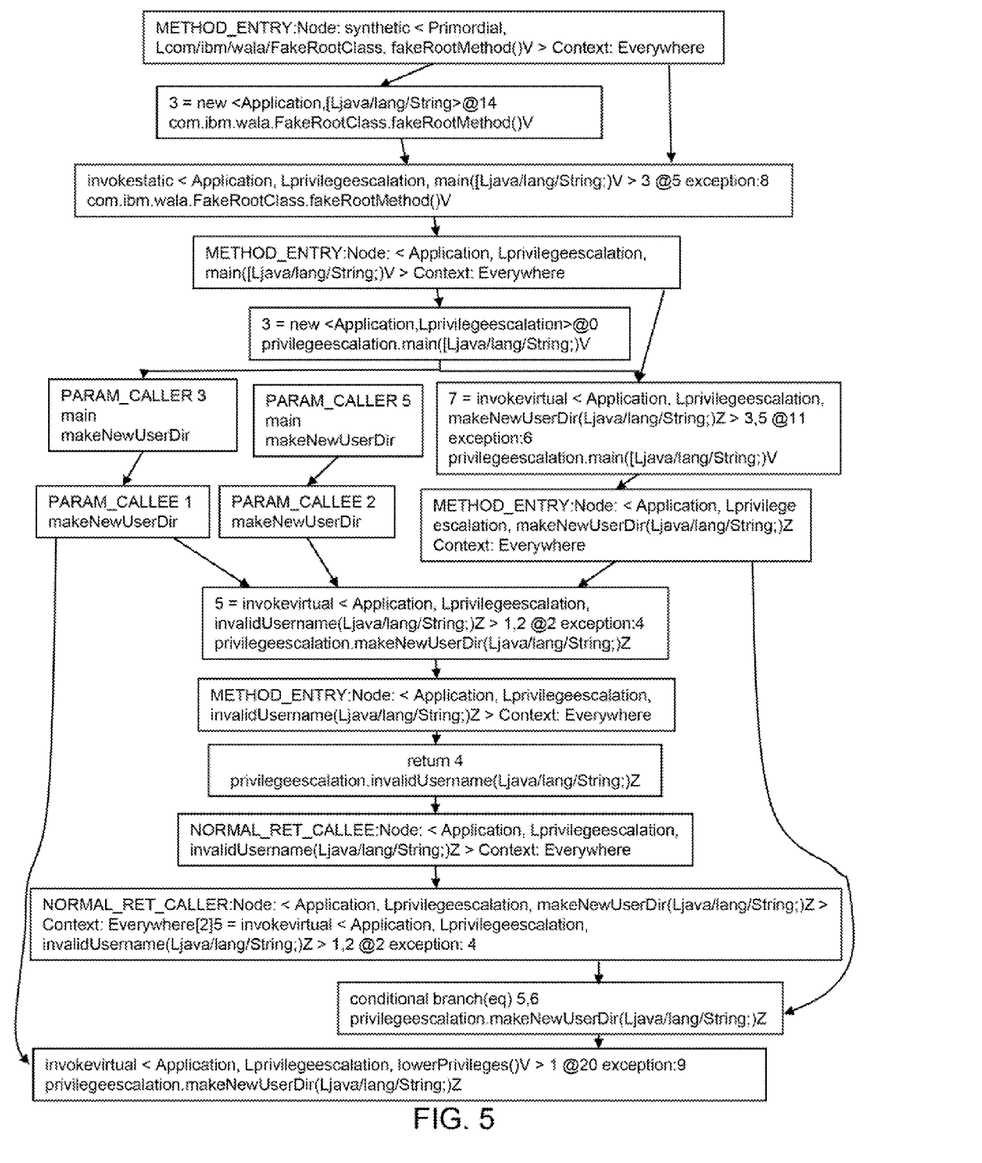
FIG. 5 is an example of a system dependence graph of a simple program.
Figure 6:
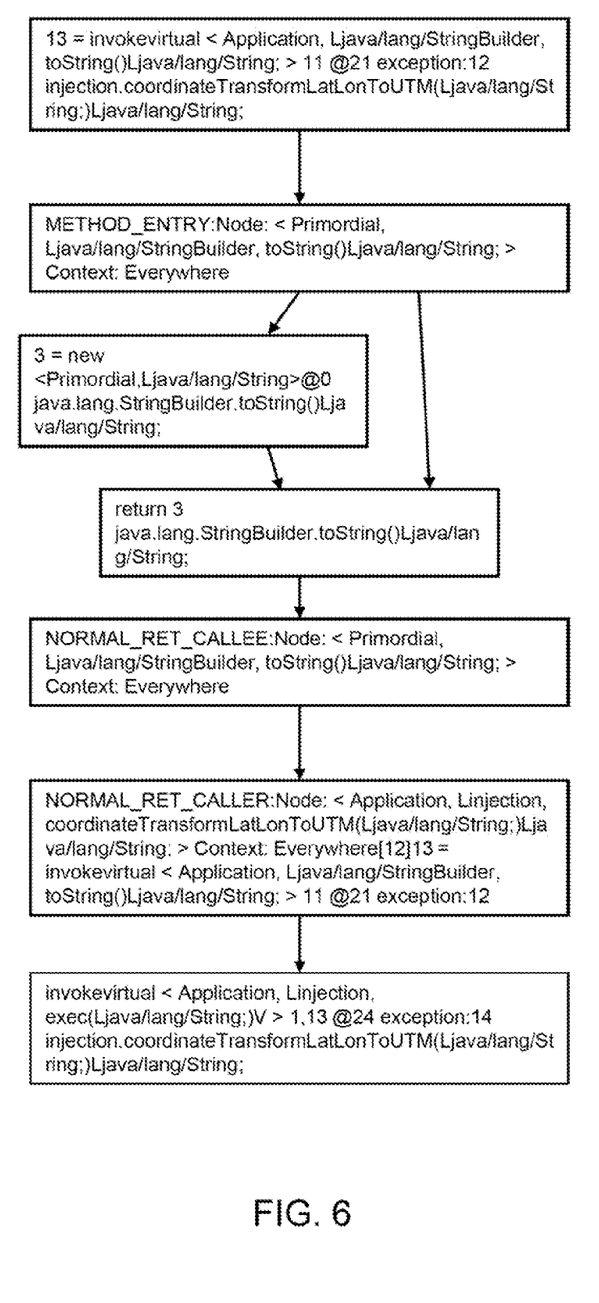
FIG. 6 is a flow chart depicting a forward program slice of a program with loops and control dependences.

The main steps are as follows:
1. Construct program's system dependence graph (SDG) (an example of which is depicted in FIG. 5). The SDG must include exceptional paths (i.e., edges between program blocks/nodes due to exceptions) in order to fully account for all information flows in a program. The SDG is a directed graph representing the flow chart dependencies in the source code. The SDG is constructed by a standard program analysis tool.
2. From the SDG, identify all the paths containing the nodes of interests through program slicing.
    i. For confidentiality analysis, compute a forward slice from the high confidentiality variables (an example of which is depicted in FIG. 6). The forward slice can be computed, for example, using breadth-first search algorithm.
    ii. For integrity analysis, compute a backwards slice from the low integrity variables. The backwards slice can be computed, for example, using a breadth-first search algorithm.
    iii. If both sources and sinks are known (for example, when the policy explicitly specify the high-security input and low-security output), compute both the forwards slice on the sources and backwards slice on the sinks. Then compute the intersection of the two slices using standard intersection algorithms.
3. Present the result of the program slicing (i.e., a set of paths where the information flow may be violated) to the analyst.
4. Ask the analyst for feedback for refinement principally through more security level labeling and declassification cuts (a declassification cut is a set of vertices in SDG, such that any path that potentially violates the information flow policy goes through one of these vertices).
5. Repeat the program slicing step on the previous slice to refine it. Stop the process when an analyst feels that the new information flow policy is in agreement with the intentional policy.

Program slicing on the system dependence graph is necessary in order to identify both control and data dependences that give rise to implicit and explicit information flow respectively. Both the forward and the backward slices are needed. The forward slice is a set of points that are reachable from the sources. The backward slice is a set of points from which a sink can be reached.

By definition of a forward slice, the forward slice determines all the paths high confidentiality/low integrity information goes through. By definition of a backward slice, the backward slice determines the dependencies for all the low confidentiality/high integrity sinks. Therefore, the intersection of these two slices determines the information flow relevant program paths, and thus an approximation of the effective information flow policy of a program. This flows from definitions. Any points that do not belong to this intersection may not have an effect on the information flow policy.

This representation of policy can be optimized by a combination of interactive input from the user (to identify or eliminate declassification points) and the techniques described above (i.e., common sub-expression elimination, pushing declassification up the graph, etc.).

What is claimed is:
1. A computer implemented method for information flow security inference through program slicing, the method comprising an act of causing one or more hardware processors to execute instructions encoded on a non-transitory computer-readable medium, such that upon execution of the instructions, the one or more hardware processors perform operations of:
   receiving an information flow security policy for source code security;
   refining the information flow security policy by performing operations of:
     constructing a system dependence graph (SDG) of a program source code, the SDG being a directed graph representing flow chart dependencies in the source code and having program blocks and nodes, with paths between the blocks and nodes;
     identifying in the SDG all paths containing nodes of interest through program slicing for both confidentiality analysis and integrity analysis, such that for confidentiality analysis, a forward slice is computed from high confidentiality variables, and for integrity analysis, a backwards slice is computed from low integrity variables;
   analyzing the source code to provide refinements as constraints;

identifying a section of the source code that violates the constraints; and removing, via the one or more hardware processors, the section of the source code that violates the constraints to generate an encoded source code that is compliant with the information flow security policy.

2. The computer implemented method as set forth in claim 1, further comprising operations of:
if both sources and sinks are known, computing both a forwards slice on the sources and a backwards slice on the sinks and computing the intersection of the two slices;
presenting slicing results to an analyst for feedback for refinement through security level labeling and declassification cuts to generate a new information flow policy;
if the analyst determines that the new information flow policy is in agreement with an intentional policy, then stopping; and
if the analyst determines that the new information flow policy is not in agreement with an intentional policy, then repeating program slicing and presentation of the results to the analyst.

3. The computer implemented method as set forth in claim 1, wherein if both sources and sinks are known, the one or more hardware processors perform operations of:
computing both a forwards slice on the sources and a backwards slice on the sinks; and
computing the intersection of the two slices.

4. The computer implemented method as set forth in claim 1, further comprising an operation of presenting slicing results to an analyst for feedback for refinement through security level labeling and declassification cuts to generate a new information flow policy, such that if the analyst determines that the new information flow policy is in agreement with an intentional policy, then stopping, and if the analyst determines that the new information flow policy is not in agreement with an intentional policy, then repeating program slicing and presentation of the results to the analyst.

5. A computer program product for information flow security inference through program slicing, the computer program product comprising:
a non-transitory computer-readable medium having executable instructions encoded thereon, such that upon execution of the instructions by one or more hardware processors, the one or more hardware processors perform operations of:
receiving an information flow security policy for source code security;
refining the information flow security policy by performing operations of:
constructing a system dependence graph (SDG) of a program source code, the SDG being a directed graph representing flow chart dependencies in the source code and having program blocks and nodes, with paths between the blocks and nodes;
identifying in the SDG all paths containing nodes of interest through program slicing for both confidentiality analysis and integrity analysis, such that for confidentiality analysis, a forward slice is computed from high confidentiality variables, and for integrity analysis, a backwards slice is computed from low integrity variables;
analyzing the source code to provide refinements as constraints; identifying a section of the source code that violates the constraints; and
removing, via the one or more hardware processors, the section of the source code that violates the constraints to generate an encoded source code that is compliant with the information flow security policy.

6. The computer program product as set forth in claim 5, further comprising instructions for causing the one or more processors to perform operations of:
if both sources and sinks are known, computing both a forwards slice on the sources and a backwards slice on the sinks and computing the intersection of the two slices;
presenting slicing results to an analyst for feedback for refinement through security level labeling and declassification cuts to generate a new information flow policy;
if the analyst determines that the new information flow policy is in agreement with an intentional policy, then stopping; and
if the analyst determines that the new information flow policy is not in agreement with an intentional policy, then repeating program slicing and presentation of the results to the analyst.

7. The computer program product as set forth in claim 5, wherein if both sources and sinks are known, the one or more hardware processors perform operations of:
computing both a forwards slice on the sources and a backwards slice on the sinks; and
computing the intersection of the two slices.

8. The computer program product as set forth in claim 5, further comprising instructions for causing the one or more hardware processors to perform an operation of presenting slicing results to an analyst for feedback for refinement through security level labeling and declassification cuts to generate a new information flow policy, such that if the analyst determines that the new information flow policy is in agreement with an intentional policy, then stopping, and if the analyst determines that the new information flow policy is not in agreement with an intentional policy, then repeating program slicing and presentation of the results to the analyst.

9. A system for information flow security inference through program slicing, the system comprising:
one or more hardware processors and a memory, the memory being a non-transitory computer-readable medium having executable instructions encoded thereon, such that upon execution of the instructions, the one or more hardware processors perform operations of:
receiving an information flow security policy for source code security;
refining the information flow security policy by performing operations of:
constructing a system dependence graph (SDG) of a program source code, the SDG being a directed graph representing flow chart dependencies in the source code and having program blocks and nodes, with paths between the blocks and nodes;
identifying in the SDG all paths containing nodes of interest through program slicing for both confidentiality analysis and integrity analysis, such that for confidentiality analysis, a forward slice is computed from high confidentiality variables, and for integrity analysis, a backwards slice is computed from low integrity variables;
analyzing the source code to provide refinements as constraints;
identifying a section of the source code that violates the constraints; and
removing, via the one or more hardware processors, the section of the source code that violates the constraints to generate an encoded source code that is compliant with the information flow security policy.

10. The system as set forth in claim 9, further comprising operations of:
- if both sources and sinks are known, computing both a forwards slice on the sources and a backwards slice on the sinks and computing the intersection of the two slices;
- presenting slicing results to an analyst for feedback for refinement through security level labeling and declassification cuts to generate a new information flow policy;
  - if the analyst determines that the new information flow policy is in agreement with an intentional policy, then stopping; and
  - if the analyst determines that the new information flow policy is not in agreement with an intentional policy, then repeating program slicing and presentation of the results to the analyst.

11. The system as set forth in claim 9, wherein if both sources and sinks are known, the one or more hardware processors perform operations of:
- computing both a forwards slice on the sources and a backwards slice on the sinks; and
- computing the intersection of the two slices.

12. The system as set forth in claim 9, further comprising an operation of presenting slicing results to an analyst for feedback for refinement through security level labeling and declassification cuts to generate a new information flow policy, such that if the analyst determines that the new information flow policy is in agreement with an intentional policy, then stopping, and if the analyst determines that the new information flow policy is not in agreement with an intentional policy, then repeating program slicing and presentation of the results to the analyst.

* * * * *